United States Patent
Rich (10) Patent No.: US 8,282,112 B2
(45) Date of Patent: Oct. 9, 2012

(54) VEHICLE FRONT WHEEL PIVOT LOCK

(76) Inventor: Thomas M. Rich, Lebanon, IN (US)

( * ) Notice: Subject to any disclaimer, the term of this patent is extended or adjusted under 35 U.S.C. 154(b) by 216 days.

(21) Appl. No.: 12/833,469

(22) Filed: Jul. 9, 2010

(65) Prior Publication Data

US 2012/0007325 A1    Jan. 12, 2012

(51) Int. Cl.
*B62D 13/04*    (2006.01)
*B60B 33/00*    (2006.01)
(52) U.S. Cl. .................... 280/86; 56/16.7; 16/35 R
(58) Field of Classification Search ............. 280/82, 280/86, 98, 124.117, 137.5; 56/14.7, 15.4, 56/15.5, 16.7; 16/35 R, 45
See application file for complete search history.

(56) References Cited

U.S. PATENT DOCUMENTS

| | | | | |
|---|---|---|---|---|
| 4,368,806 A * | 1/1983 | Raineri | ................. | 188/2 R |
| 5,653,096 A * | 8/1997 | Edwards | ................. | 56/16.7 |
| 5,819,514 A * | 10/1998 | Firdaus | ................. | 56/16.7 |
| 5,983,614 A * | 11/1999 | Hancock et al. | ................. | 56/16.7 |
| 6,240,713 B1 * | 6/2001 | Thomas | ................. | 56/16.7 |
| 6,701,699 B2 * | 3/2004 | Fontanes, II et al. | ................. | 56/16.7 |
| 7,574,850 B1 * | 8/2009 | Nunez | ................. | 56/16.7 |

* cited by examiner

*Primary Examiner* — Joseph Rocca
(74) *Attorney, Agent, or Firm* — Woodard Emhardt Moriarty McNett & Henry LLP (57) ABSTRACT

A vehicle has first and second rear drive wheels that are driven independently of each other and a pair of front wheels that freely rotate about a vertical axis wherein the rear drive wheels and the front wheels are rotatably mounted to a frame. A locking mechanism is operatively connected to the pair of front wheels to restrain the rotation of the front wheels about the vertical axis and maintain the pair of front wheels in a forward position while the operator engages the locking mechanism. When the operator releases the locking mechanism, the locking mechanism is removed from the pair of front wheels and the pair of front wheels are free to rotate about the vertical axis.

17 Claims, 7 Drawing Sheets

VEHICLE FRONT WHEEL PIVOT LOCK

BACKGROUND

The present invention relates generally to a Zero-Turning-Radius ("ZTR") vehicle. Specifically, the present invention restricts movement of the front wheels as desired by a user of the vehicle.

Whether a lawn mower is utilized commercially or for personal use, efficient operation is essential. Typically, contractors desire to mow a yard as quickly as possible so they may complete more jobs in a day. Similarly, a homeowner wants to mow his yard quickly so that he may move on to other activities. ZTR vehicles are particularly useful in the lawn care industry. ZTR vehicles adapted to include various lawn care attachments have become particularly popular in the lawn care industry because their tight cornering capability obviates the constant need to shift gears from forward to reverse or to drive in a wide loop in order to turn around, as is necessitated by the large turning radius of a non-ZTR vehicle. These benefits of a ZTR vehicle can save time for the operators.

ZTR vehicles have the capability to make turns having a center of rotation at the midpoint between the independent rear drive wheels. This is accomplished by driving the independent rear drive wheels at different speeds, and even in different directions, with respect to each other. Operators of ZTR vehicles steer the vehicle by maneuvering separate levers responsible for controlling the independent drives of each rear wheel rather than providing a steering wheel. Often the operators find the dual lever system extremely difficult to operate.

In ZTR vehicles, since the independent rear drive wheels steer the vehicle as well as engage the ground, it is not necessary for the front wheels to be steerable. Therefore, caster wheels are often used for the front ground-engaging wheels. Caster wheels spin 360 degrees about a vertical axis of rotation but are not steered. Rather, the front caster wheels simply respond to the movement and direction of the vehicle as dictated by the rear drive wheels.

One problem associated with the front caster wheels results as the ZTR vehicle is driven up or down hill and any variation in the speed and direction between the independent rear drive wheels causes one or both of the front caster wheels to pivot. As either or both of the front caster wheels pivot, the ZTR vehicle tends to turn away from the intended path of travel. Moreover, the ZTR vehicle typically has a heavy load over the front caster wheels which results in a large moment over the rear wheels. This large moment over the rear wheels also causes the ZTR vehicle to turn away from the intended path of travel. To counteract this unintended movement of the ZTR vehicle, the operator must adjust the speeds and/or directions of the rear drive wheels to steer the ZTR vehicle back to the intended path of travel. As can be appreciated, the constant adjustment to the rear drive wheels can be difficult to learn.

Another problem with these non-steerable front wheels results when a ZTR vehicle is driven laterally across the side of a hill. As the ZTR vehicle is driven across the hill, the gravitational force of the ZTR vehicle tends to pull the vehicle down the hill, and correspondingly the front caster wheels turn towards the bottom of the hill. Again, to maintain the intended path of travel, the operator must continually adjust the direction and speed of the independent rear drive wheels.

The need exists for a ZTR vehicle that can selectively limit pivotal movement of the front wheels of the vehicle separate from the rear drive wheels in order to provide more efficient and effective operation and reduce or eliminate the unintentional veering of the ZTR vehicle. The need also exists for a ZTR vehicle that is more user-friendly.

Thus, there is a need for improvement in this field.

SUMMARY

The inventors have found that it is beneficial to selectively restrain a pair of front wheels in a forward direction on a ZTR vehicle as desired by the operator of the ZTR vehicle. One illustrative embodiment includes an engagement mechanism that is engaged by the operator when the operator desires to lock the pair of front wheels in a forward direction. The operator maintains engagement of the engagement mechanism to restrain the pair of front wheels and releases the engagement mechanism when the operator desires free rotation of the pair of front wheels.

The engagement mechanism is connected to a locking mechanism that engages and restrains the pair of front wheels. In one form, the locking mechanism includes a first angle configured to engage and restrain one of the pair of front wheels in a forward direction and a second angle configured to engage and restrain the other of the pair of front wheels in a forward direction when the engagement mechanism is engaged.

In one form, the first and second angles are operable by the release of at least one vertical spring which allows a pair of horizontal springs to compress and cause an urging force to act on the first and second angles as described next. In this form, the locking mechanism includes a vertical spring that extends from a vehicle frame to a body member that is pivotably connected to the frame. The body member is rotated while the engagement mechanism is engaged. The vertical spring is operable between an initial position wherein the vertical spring is compressed to a final position wherein the vertical spring is stretched and the body member is rotated to release a first and a second horizontal spring to return to a compressed state. Further in this form, the locking mechanism includes a first horizontal spring extending from the body member to the first angle and a second horizontal spring extending from the body member to the second angle. The first and second horizontal springs are operable between an initial position wherein the first and second horizontal springs are stretched to a final position wherein the first and second horizontal springs are compressed to pull the first and second angles to engage and restrain the pair of front wheels in a forward direction.

Moreover, a first arm may be pivotally connected to the frame wherein the first arm includes a first rod engagement portion. In this form, the first angle is attached to the first arm. A second arm may be pivotally connected to the frame wherein the second arm includes a second rod engagement portion. In this form, the second angle is attached to the second arm. An engagement rod is attached to the body member such that the engagement rod extends from the first rod engagement portion to the second rod engagement portion. When the body member is rotated, the engagement rod correspondingly moves downward such that the first and second arms can also pivot downward.

Further forms, objects, features, aspects, benefits, advantages, and embodiments of the present invention will become apparent from a detailed description and drawings provided herewith.

DESCRIPTION OF THE SELECTED EMBODIMENTS

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

Figure 1:
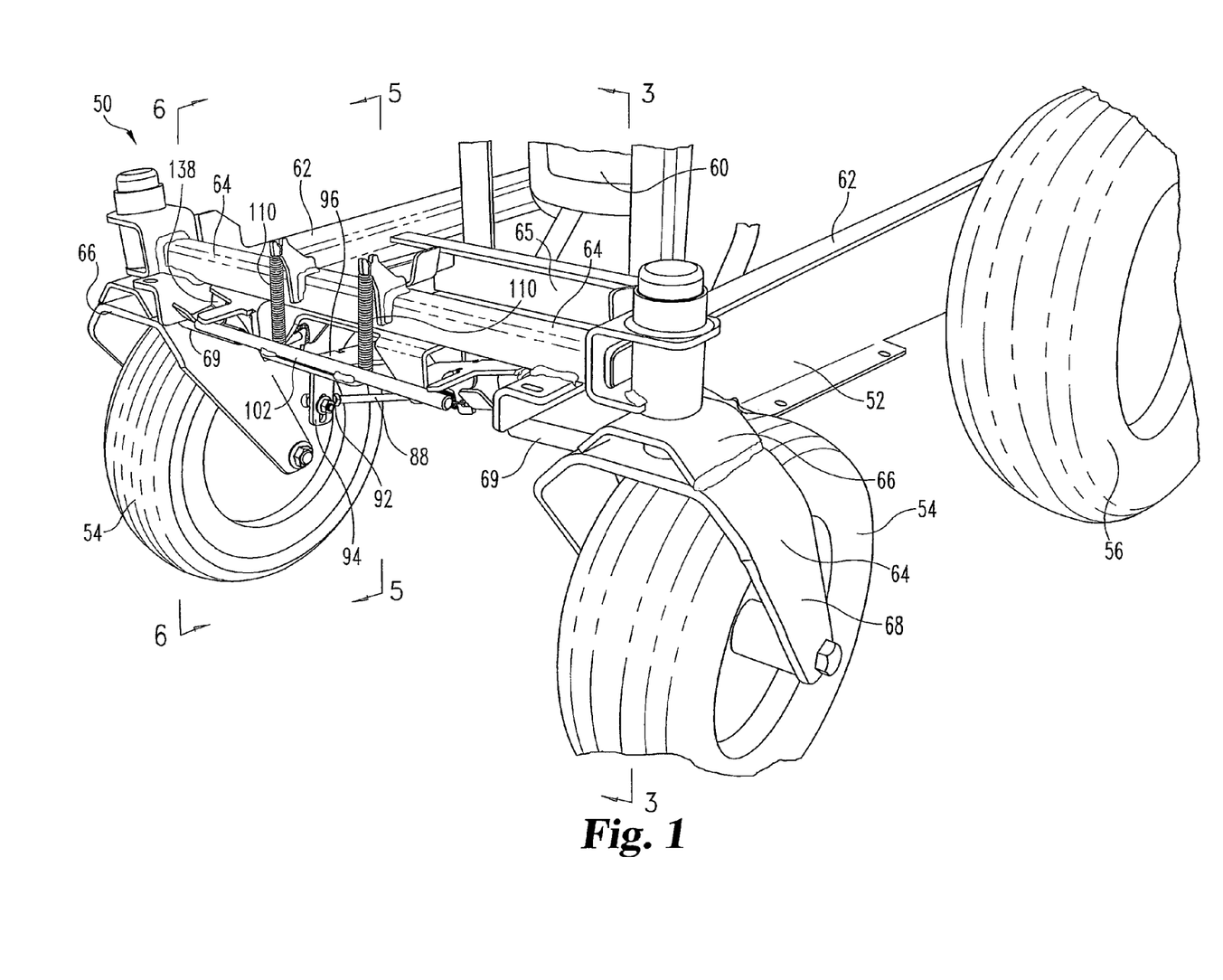
FIG. 1 is a front partial perspective view of an illustrative vehicle with a front wheel pivot locking system in an initial, unlocked position.

FIG. 1 depicts a vehicle 50 having a frame 52 which is connected to a pair of front wheels 54, a first rear drive wheel 56, and a second rear drive wheel (not illustrated). Throughout this discussion the terms "forward" and "backward" or "rearward" refer to the directions associated with the vehicle 50 shown in the figures, where "forward" would normally be associated with a direction toward the front of the vehicle 50, and "backward" would normally be associated with a direction toward the back of the vehicle 50. An engine 60 is mounted on the frame 52 to provide power for the vehicle 50. The engine 60 is an internal combustion engine, diesel engine, or any type of engine that provides power for the vehicle 50.

The frame 52 includes a pair of longitudinal beams 62 wherein one of the longitudinal beams 62 connects with one of the front wheels 54 and the first rear drive wheel 56. The other of the longitudinal beams 62 connects with the other one of the front wheels 54 and a second rear drive wheel. A front cross beam 64 is attached perpendicularly to the pair of longitudinal beams 62, and the front cross beam 64 spans between the pair of front wheels 54. A mid cross beam 65 is attached perpendicular to the pair of longitudinal beams 62. The mid cross beam 65 is positioned rearwardly of the front cross beam 64. A rear cross beam (not illustrated) is attached perpendicularly to the pair of longitudinal beams 62 and the rear cross beam spans between the first rear drive wheel 56 and the second rear drive wheel. A caster frame 66 is rotatably mounted to a forward end of each of the pair of longitudinal beams 62. Each of the caster frames 66 includes a u-shaped member 68 and a bar 69 that extends from the u-shaped member 68. The u-shaped member 68 is sized and configured to rotatably receive one of the front wheels 54. When the pair of front wheels 54 are positioned in a forward direction, the bar 69 is parallel to the front cross beam 64. The caster frame 66 is configured to rotate about a vertical axis until an operator engages an engagement mechanism to restrict motion of the bar 69 and the caster frame 66 as described below. As desired, the operator can release the engagement mechanism to release the bar 69 and enable rotation of the caster frame 66.

Figure 2:
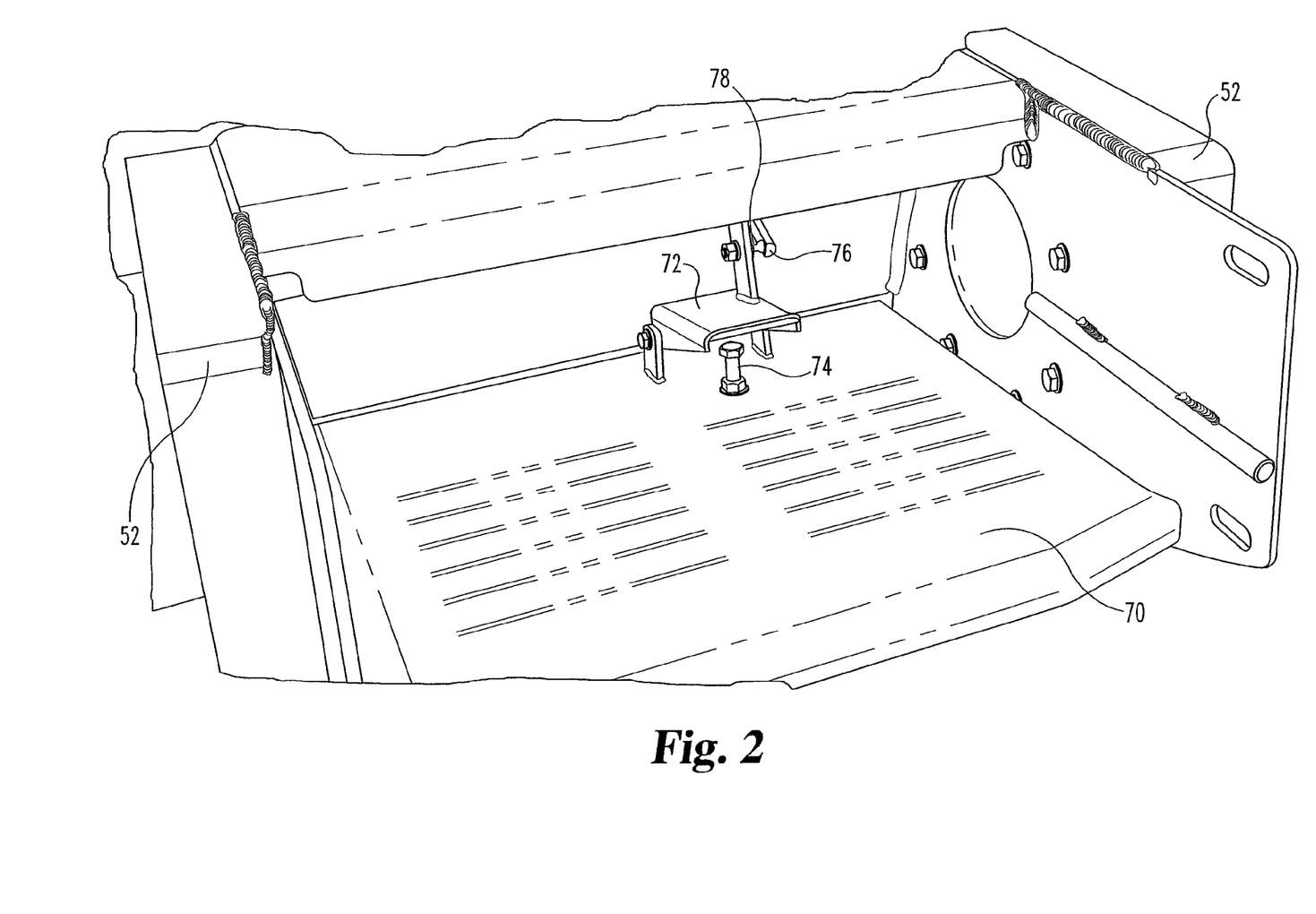
FIG. 2 is a rear partial perspective view of the illustrative vehicle of FIG. 1.

As illustrated in FIG. 2, a platform 70 is mounted on the frame 52 upon which a user stands to operate the vehicle 50. In this embodiment, the engagement mechanism is a pedal 72 that is pivotally mounted on the platform 70. In other embodiments, the engagement mechanism is configured differently. Under the pedal 72 is a stopper 74 that is mounted to the platform 70. As described in more detail below, when the operator desires to limit rotation of the pair of front wheels 54 and maintain the pair of front wheels 54 in a forward direction, the operator presses the pedal 72 against the stopper 74. As shown in FIG. 2, in an initial, unengaged position the pedal 72 does not engage the stopper 74 nor does the pedal 72 limit rotation of both of the caster frames 66. In a final, engaged position, the pedal 72 is depressed and rests against the stopper 74. In the final position, the depression of pedal 72 restrains both of the caster frames 66 from rotation and correspondingly the front wheels 54 are locked in a forward position. As desired, the user can release pressure on the pedal 72 allowing the pedal 72 to return to its initial position and the caster frames 66 freely rotate about a vertical axis.

Figure 3:
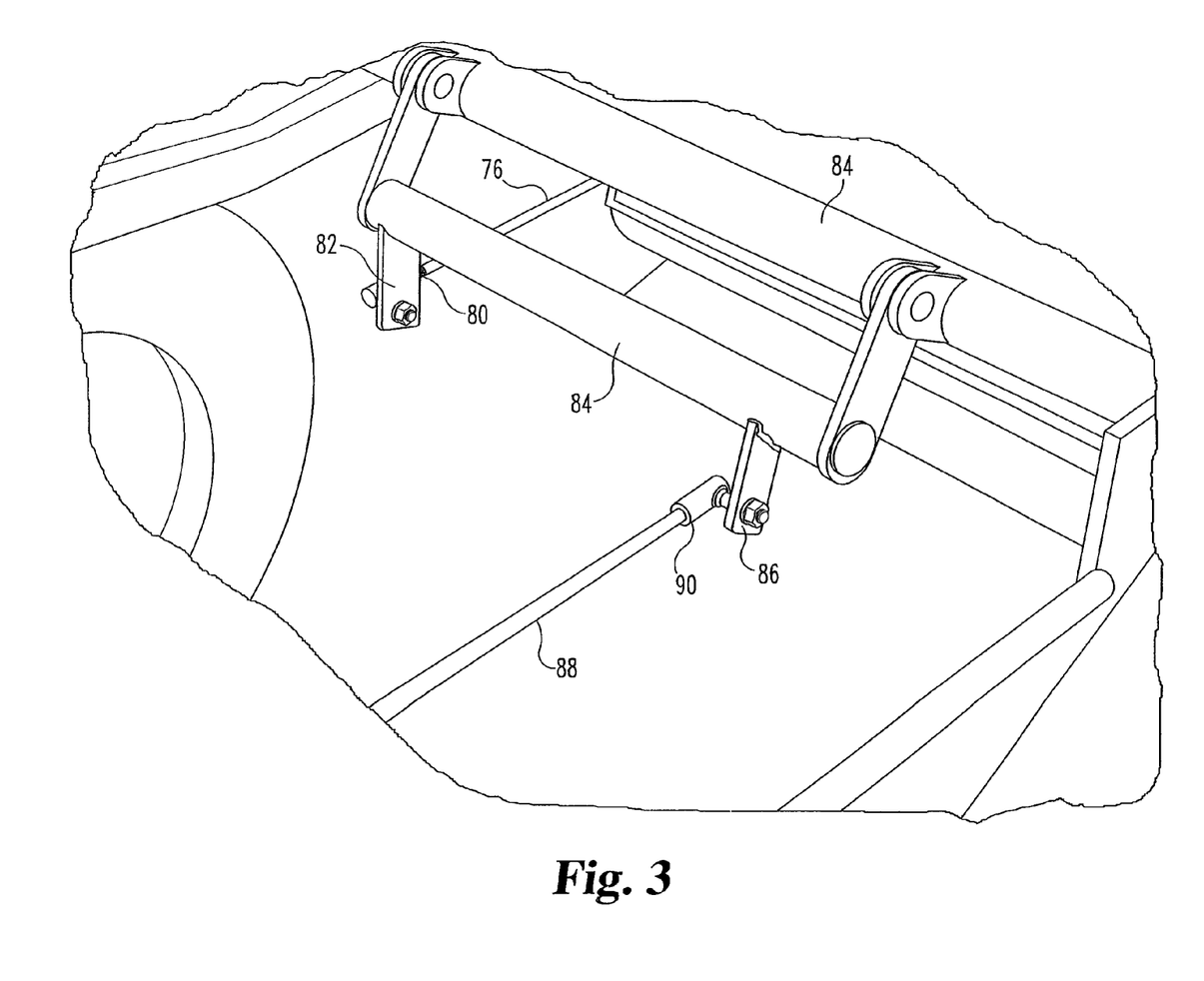
FIG. 3 is a sectional view taken generally along the line 3-3 of FIG. 1.
Figure 4:
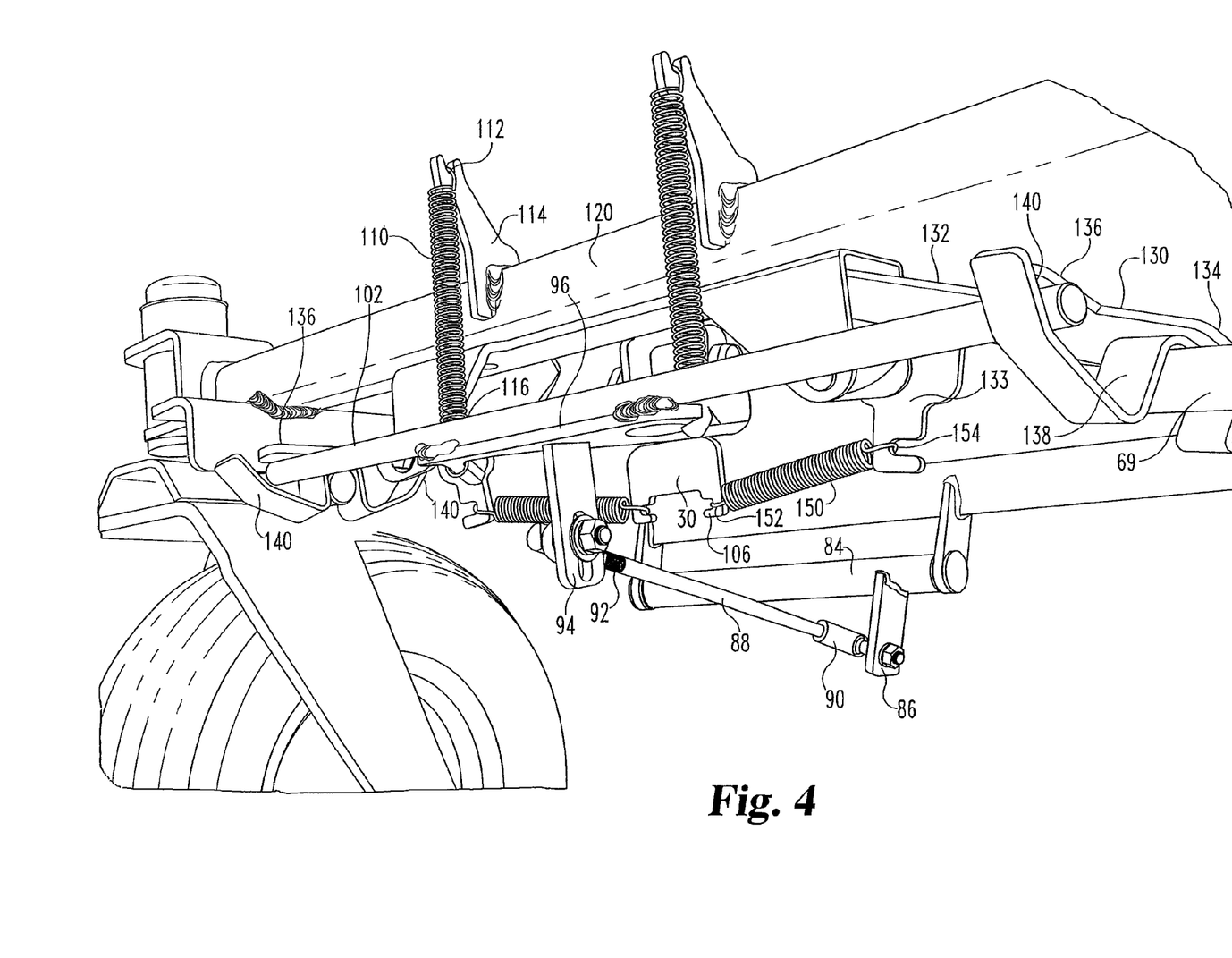
FIG. 4 is a partial perspective view of the illustrative vehicle of FIG. 1 in a final, locked position.

As illustrated in FIGS. 2 and 3, a first link 76 has a first end 78 opposite a second end 80. The first end 78 of the first link 76 is attached to the pedal 72. The first link 76 extends from the pedal 72 and the second end 80 connects with a first pivot arm 82 that is forward of the platform 70. The first pivot arm 82 is connected to a horizontal bar 84 upon which a second pivot arm 86 is mounted. The horizontal bar 84 spans between the first pivot arm 82 and the second pivot arm 86 as shown in FIG. 3. The horizontal bar 84 is pivotally attached to the mid cross beam 65. A second link 88 includes a first end 90 opposite a second end 92. The first end 90 is connected to the second pivot arm 86 and the second link 88 extends from the second pivot arm 86 to a front pivot arm 94 that is forward of the front cross beam 64. The second end 92 of second link 88 is connected to the front pivot arm 94 as illustrated in FIG. 4. In operation, when pedal 72 is depressed towards the stopper 74, the first link 76 is pulled rearwardly. Correspondingly, as the first link 76 is pulled rearwardly, the horizontal bar 84 and the second link 88 are pulled rearwardly. In other embodiments, other members can be used to connect the pedal to the front pivot arm 94.

Figure 5:
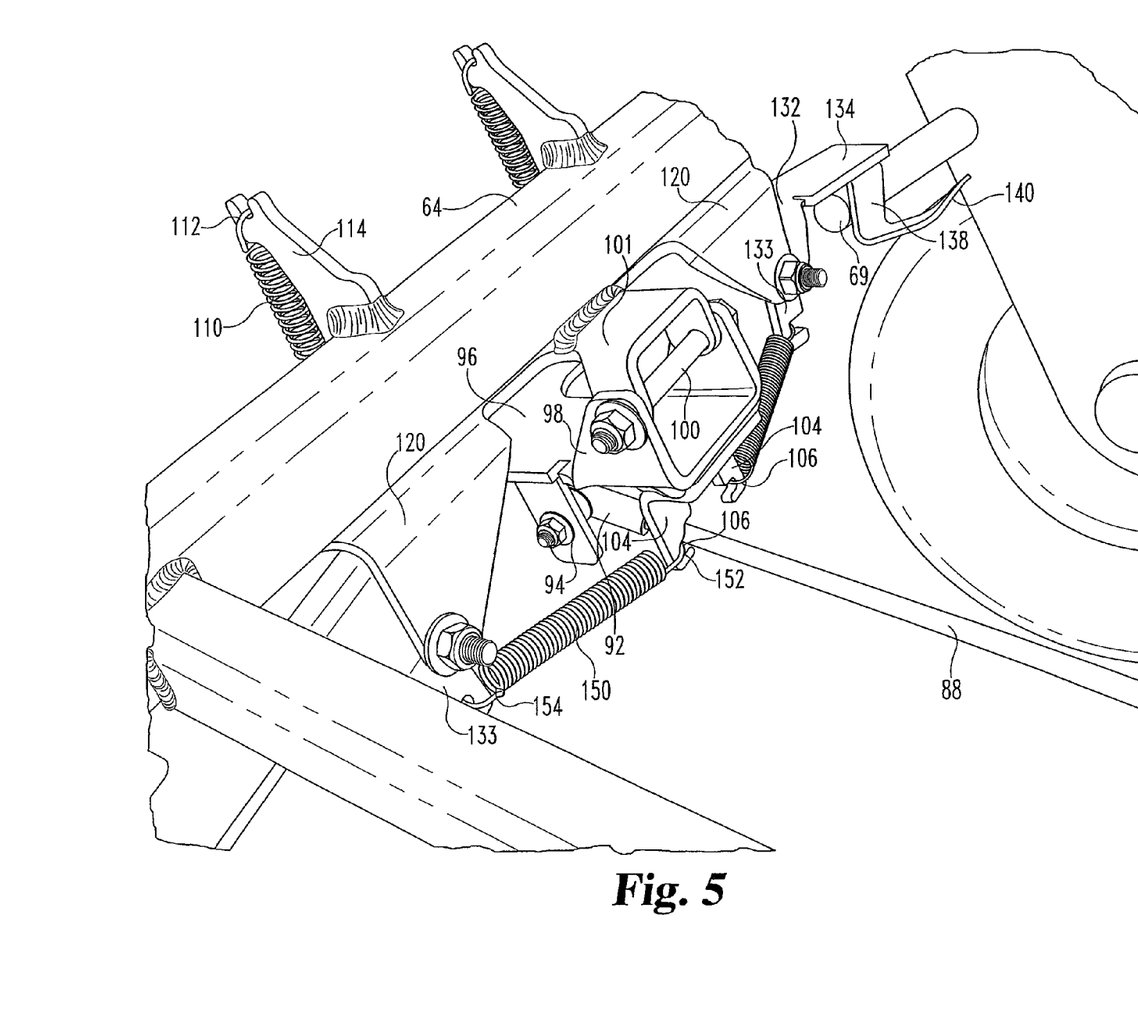
FIG. 5 is a sectional view taken generally along the line 5-5 of FIG. 1, wherein the front wheel pivot locking system is in a final, locked position.

The front pivot arm 94 is attached to the bottom of a body member 96 that is pivotally attached to the front cross beam 64 as described next. As illustrated in FIG. 5, the body member 96 includes a bracket 98 that is pivotally attached to a u-bracket 101 that extends from the front cross beam 64. A tie rod 100 connects bracket 98 to u-bracket 101. An engagement rod 102 is mounted to the top of the body member 96 and positioned above the front pivot arm 94 as shown in FIG. 1.

As shown in FIG. 5, on the bottom side of bracket 98 is an flange 104. The flange 104 includes a pair of hook ends 106. Each of the hook ends 106 is configured to receive and retain one end of a horizontal spring 150 as described below.

In the embodiment illustrated in FIGS. 1, 4, and 5 is a pair of vertical springs 110. In other embodiments, a single vertical spring is used. Each of the pair of vertical springs 110 has a first end 112 opposite a second end 116. A pair of triangular brackets 114 is mounted on the front cross beam 64. The first end 112 of each of the vertical springs 110 is attached to one of the triangular brackets 114. The second end 116 of each of the vertical springs 110 is attached to body member 96. As such, the vertical springs 110 span between the triangular brackets 114 mounted on the front cross beam 64 and the body member 96.

Figure 6:
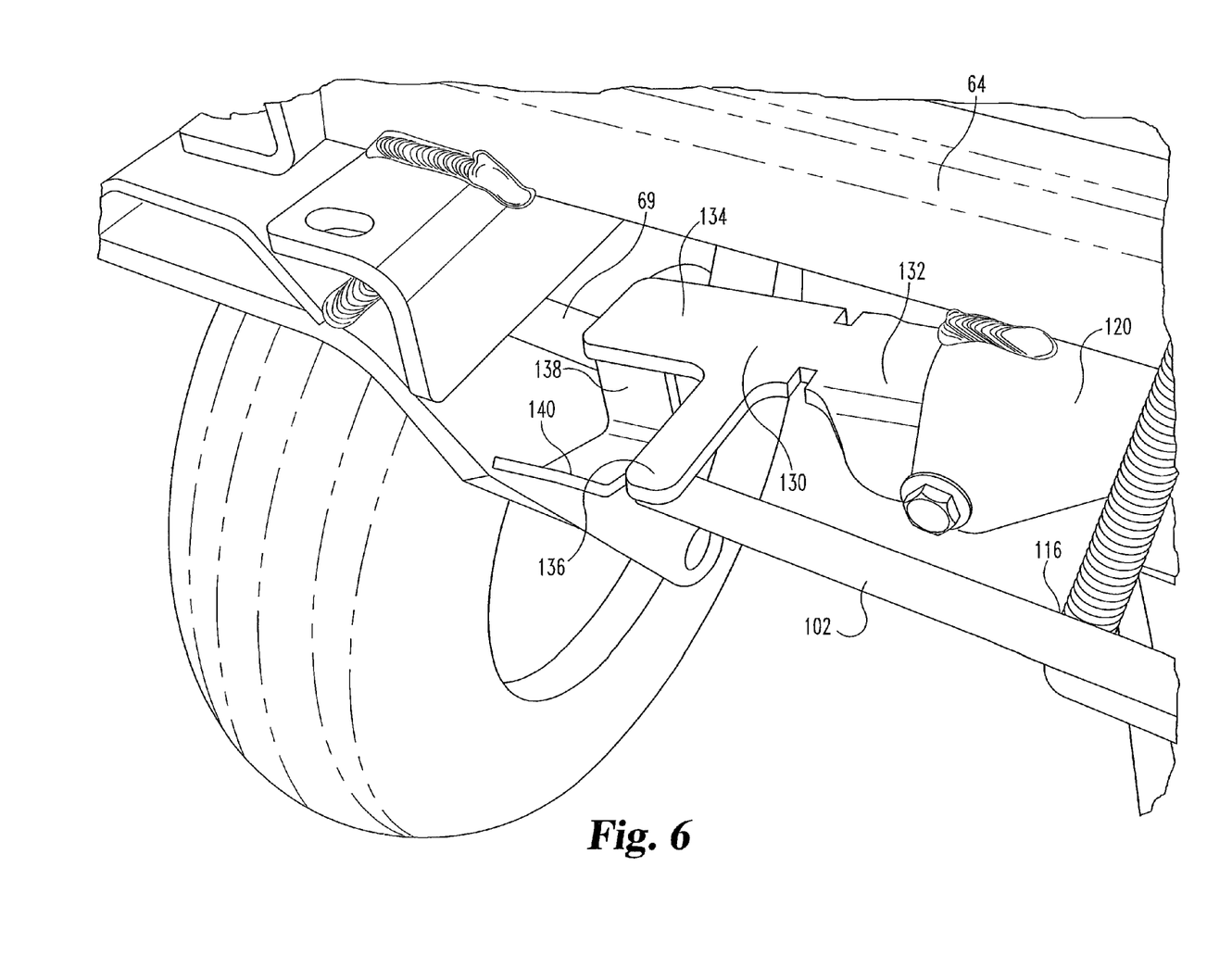
FIG. 6 is a sectional view taken generally along the line 6-6 of FIG. 1, wherein the front wheel pivot locking system is in a final, locked position.

As shown in FIGS. 5 and 6, a pair of frames 120 is attached to the front cross beam 64 such that each of the frames 120 is positioned adjacent the body member 96. Each of the frames 120 has a u-shape. In other embodiments, the frames 120 are shaped differently. An arm 130 is pivotally connected to each of the frames 120. The arm 130 includes a frame attachment portion 132 adjacent a rod engagement portion 134. The frame attachment portion 132 includes a hook 133 that receives one end of the horizontal spring 150 as described below. The rod engagement portion 134 includes a flange 136 that extends towards the engagement rod 102. The arm 130 also includes an angle 138. The angle 138 is a u-shape with an outwardly flared end 140 on each side. The angle 138 is sized to extend over the bar 69 to restrain the caster frame 66 from motion. In the initial position, the engagement rod 102 contacts and presses against the flange 136 to lift the angle 138 above the bar 69. In the final position, the engagement rod 102 is lowered away from the flange 136 such that the arm 130 pivots downward. As arm 130 pivots downward, the angle 138 also rotates downward and engages the bar 69 to thereby restrain the caster frame 66 from rotation.

The pair of horizontal springs 150 each includes a first end 152 opposite a second end 154. The first end 152 is attached to one of the hook ends 106 on flange 104 and the second end 154 is attached to hook 133 of frame attachment portion 132 such that each of the horizontal springs 150 spans between the hook ends 106 of the flange 104 on bracket 98 and the hook 133 of the frame attachment portion 132.

Figure 7:
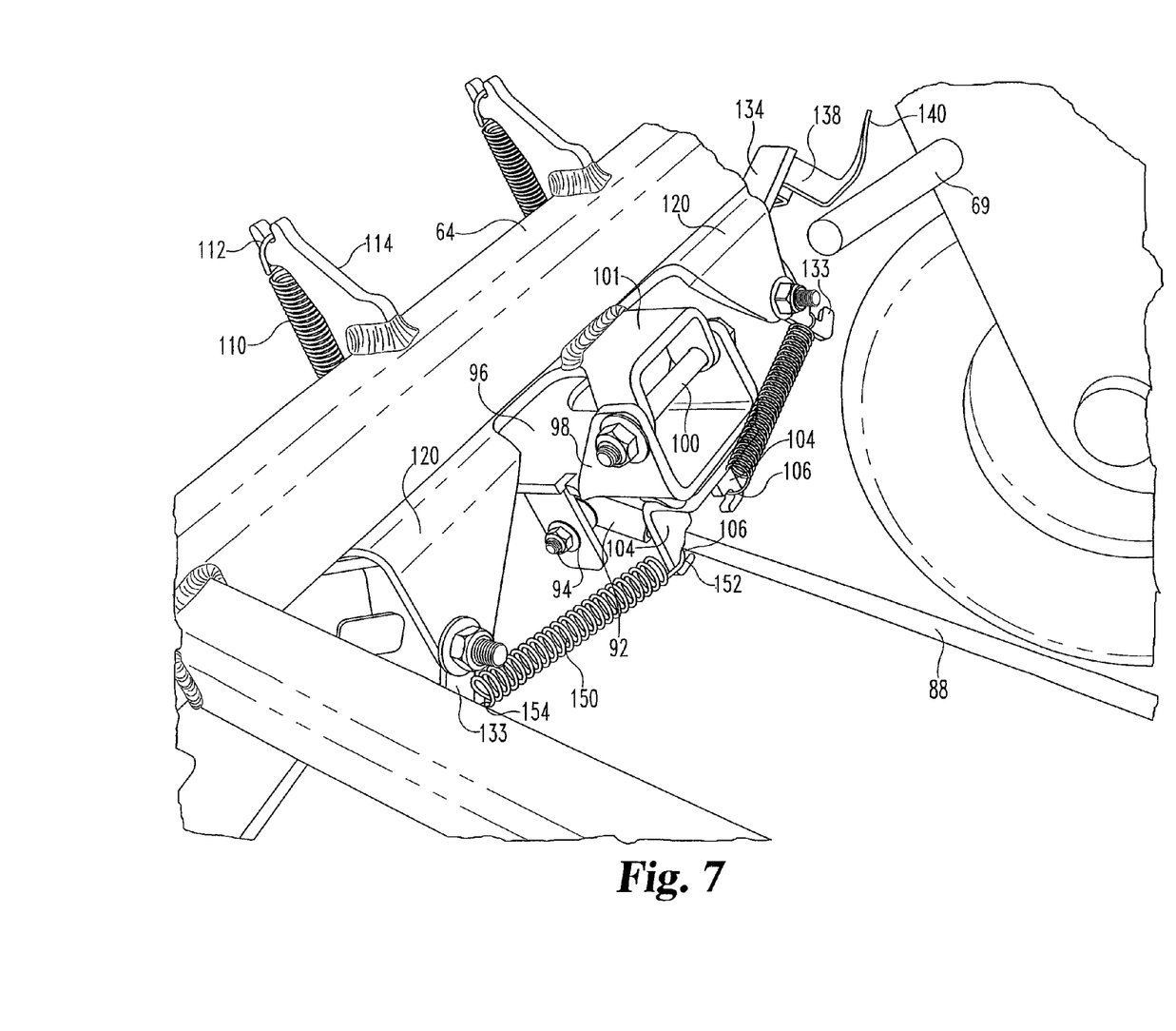
FIG. 7 is a similar view as FIG. 5 wherein the front wheel pivot locking system is in an initial, unlocked position.

In an initial position, when an operator desires free rotation of the front wheels 54, the pedal 72 remains in an upright position. As such, the vertical springs 110 remain compressed such that the vertical springs 110 apply an upward biasing force on the engagement rod 102 to urge or force the engagement rod 102 against both of the flanges 136. In the initial position, the angle 138 does net engage the bar 69; therefore, the caster frames 66 are free to rotate about a vertical axis.

When the operator desires to restrain the motion of the caster frame 66, the pedal 72 is depressed and held against stopper 74. In this final position, the front wheels 54 are positioned in a forward direction and the caster frame 66 is restrained from motion as described next. The depression of pedal 72 pulls the first link 76 towards the rear of the vehicle 50. Correspondingly, the first pivot arm 82 pivots rearward which causes the horizontal bar 84 and the second pivot arm 86 to also pivot rearward. The second link 88 connected to the second pivot arm 86 also pivots toward the rear of vehicle 50. As the second link 88 moves rearward, the body member 96 will pivot downward. As the body member 96 moves downward, the engagement rod 102 moves downward and the vertical springs 110 are stretched. As the engagement rod 102 moves downward, the flanges 136 are released and the arms 130 are freed to rotate downward. As the body member 96 moves downward, flange 104 moves rearwardly to stretch the horizontal springs 150. The urging force from the horizontal springs 150 causes the arms 130 to pivot downward. As the arms 130 pivot downward, each of the u-shaped angles 138 rotate downward to extend over the bar 69 to restrain the caster frame 66 from motion and maintain the front wheels 54 in a forward position. Each of the u-shaped angles 138 has trapped the bar 69. The caster frame 66 is restrained from rotation while the pedal 72 is depressed against the stopper 74.

When free rotation of the front wheels 54 is desired, the operator releases the pressure on pedal 72 and the first link 76, the horizontal bar 84, and the second link 88 all move forward. The body member 96 rotates upward to its original position and the vertical springs 110 and the horizontal springs 150 are released. The arms 130 pivot upward to their original position and the angles 138 rotate to their original position above the bar 69. As the angles 138 rotate to their original position, bar 69 is no longer engaged or trapped by the angles 138 therefore both of the caster frames 66 and front wheels 54 are free to rotate about the vertical axis again. As the vertical springs 110 are released and become compressed again, the engagement rod 102 is forced against both of the flanges 136 thereby stopping the angles 138 from rotating downward over the bars 69.

While the invention has been illustrated and described in detail in the drawings and foregoing description, the same is to be considered as illustrative and not restrictive in character, it being understood that only, the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The invention claimed is:

1. A vehicle having a pair of front wheels and a pair of rear wheels rotatably mounted to a frame, the vehicle having a locking mechanism for selectively restraining the pair of front wheels in a forward direction on the frame, the locking mechanism comprising:
   a first arm configured to restrain one of the pair of front wheels in a forward direction;
   a second arm configured to restrain the other of the pair of front wheels in a forward direction;
   a vertical spring extending from the frame to a body member pivotably connected to the frame, the vertical spring being operable between an initial position wherein the vertical spring is compressed to a final position wherein the vertical spring is stretched and the body member is rotated to release a first and a second horizontal spring; and
   a first horizontal spring extending from the body member to the first arm and a second horizontal spring extending from the body member to the second arm, the first and second horizontal springs being operable between an initial position wherein the first and second horizontal springs are stretched to a final position wherein the first and second horizontal springs are compressed to pull the first and second arms to restrain the pair of front wheels.

2. The locking mechanism of claim 1 further comprising a pair of caster frames rotatably mounted to the frame wherein each of the caster frames is configured to receive one of the front wheels, the first arm configured to engage and restrain one of the caster frames from rotation and the second arm configured to engage and restrain the other of the caster frames from rotation.

3. The locking mechanism of claim 2 wherein each of the caster frames has a bar configured to engage either the first arm or the second arm.

4. The locking mechanism of claim 1 further comprising:
   a pedal mounted on the frame; and
   a link extending from the pedal to the body member, the pedal is operable between an initial position wherein the pedal is not depressed and the pair of front wheels are unrestrained to a final position wherein the pedal is depressed to pull the link toward the rear of the frame and rotate the body member to thereby restrain the pair of front wheels.

5. The locking mechanism of claim 1 further comprising:
the first arm is pivotally connected to the frame, the first arm including a first rod engagement portion;
the second arm is pivotally connected to the frame, the second arm including a second rod engagement portion; and
an engagement rod attached to the body member, the engagement rod extending from the first rod engagement portion to the second rod engagement portion, wherein rotation of the body member causes the engagement rod to move downward and release the first and second arms to pivot downward.

6. A vehicle having a pair of front wheels and a pair of rear wheels rotatably mounted to a frame, the vehicle having a locking mechanism for selectively restraining the pair of front wheels in a forward direction on the frame, the locking mechanism comprising:
a pair of caster frames rotatably mounted to the frame, the caster frames configured to rotate about a vertical axis, wherein each of the caster frames is configured to receive one of the front wheels;
a first arm operatively connected to one of the caster frames and a second arm operatively connected to the other of the caster frames, the first and second arms are operable between an initial position wherein rotation of the pair of caster frames is unlimited and a final position wherein the first and second arms engage the pair of caster frames to limit rotation of the pair of caster frames;
a vertical spring extending from the frame to a body member pivotably connected to the frame, the vertical spring is operable between an initial position wherein the vertical spring is compressed to a final position wherein the vertical spring is stretched and the body member is rotated to engage a first and a second horizontal spring, and
a first spring extending from the body member to the first arm and a second spring extending from the body member to the second arm, the first and second springs are operable between an initial position wherein the first and second springs are stretched to a final position wherein the first and second springs are compressed to release the first and second arms to engage the pair of caster frames.

7. The locking mechanism of claim 6 wherein each of the caster frames has a bar configured to engage either the first arm or the second arm.

8. The locking mechanism of claim 6 further comprising:
the first arm is pivotally connected to the frame, the first arm including a first rod engagement portion;
the second arm is pivotally connected to the frame, the second arm including a second rod engagement portion; and
an engagement rod attached to the body member, the engagement rod extending from the first rod engagement portion to the second rod engagement portion, wherein rotation of the body member causes the engagement rod to move downward to release the first and second arms to pivot downward.

9. The locking mechanism of claim 6 further comprising:
an engagement mechanism mounted on the frame; and
a link extending from the engagement mechanism to the body member, the engagement mechanism is operable between an initial position wherein the engagement mechanism is not engaged to a final position wherein the engagement mechanism is engaged to pull the link toward the rear of the frame and rotate the body member.

10. The locking mechanism of claim 9 wherein the engagement mechanism is a pedal.

11. A method for selectively restraining a pair of front wheels in a forward direction on a frame of a vehicle comprising:
providing a first arm operatively connected to a first caster frame sized to receive one of the front wheels and a second arm operatively connected to a second caster frame sized to receive the other of the front wheels;
applying a force to a body member pivotably connected to the frame to rotate the body member from an initial non-rotated position wherein a first and a second spring are released to a final rotated position wherein the first and the second spring are compressed, the first spring attached to the body member and the first arm, and the second spring attached to the body member and the second arm;
releasing the first spring to return to a compressed state wherein a force from the first spring rotates the first arm over the first caster frame to restrain the first caster frame from rotation; and
releasing the second spring to return to a compressed state wherein a force from the second spring rotates the second arm over the second caster frame to restrain the second caster frame from rotation.

12. The method of claim 11 wherein the applying a force to the body member includes contacting an engagement mechanism to pull a link that extends from the body member to the engagement mechanism to rotate the body member.

13. The method of claim 11 further comprising:
releasing the force on the body member to return the body member to the initial non-rotated position;
stretching the first spring to release the force from the first spring to allow the first arm to rotate above the first caster frame to release the first caster frame to freely rotate; and
stretching the second spring to release the force from the second spring to allow the second arm to rotate above the second caster frame to release the second caster frame to freely rotate.

14. The method of claim 11 further comprising:
providing the first arm is pivotally connected to the frame, the first arm including a first rod engagement portion and a first angled portion;
providing the second arm is pivotally connected to the frame, the second arm including a second rod engagement portion and a second angled portion;
providing an engagement rod attached to the body member wherein the engagement rod extends from the first rod engagement portion to the second rod engagement portion; and
wherein applying a force to the body member to rotate the body member includes lowering the engagement rod to allow the first and second arms to pivot downward to position the first angled portion over the first caster frame and to position the second angled portion over the second caster frame.

15. The method of claim 14 further comprising:
providing a vertical spring that extends from the frame to the body member, wherein the compressed vertical spring has a force that retains the engagement rod against the first rod engagement portion and the second rod engagement portion; and
wherein the applying a force to the body member to rotate the body member to a final rotated position includes stretching the vertical spring to release the force and enable the first and second arms to pivot downward.

16. A vehicle having a pair of front wheels and a pair of rear wheels rotatably mounted to a frame, the vehicle having a locking mechanism for selectively restraining the pair of front wheels in a forward direction on the frame, the locking mechanism comprising:
 a first arm pivotally connected to the frame, the first arm configured to restrain one of the pair of front wheels in a forward direction;
 a second arm pivotally connected to the frame, the second arm configured to restrain the other of the pair of front wheels in a forward direction;
 a body member pivotably connected to the frame; and
 a first spring extending from the body member to the first arm and a second spring extending from the body member to the second arm, the first and second springs being operable between an initial position wherein the first and second springs are stretched to a final position wherein the first and second springs are compressed to pull the first and second arms to restrain the pair of front wheels.

17. A vehicle having a pair of front wheels and a pair of rear wheels rotatably mounted to a frame, the vehicle having a locking mechanism for selectively restraining the pair of front wheels in a forward direction on the frame, the locking mechanism comprising:
 a first arm pivotally connected to the frame, the first arm including a first rod engagement portion, the first arm is configured to restrain one of the pair of front wheels in a forward direction;
 a second arm pivotally connected to the frame, the second arm including a second rod engagement portion, the second arm is configured to restrain the other of the pair of front wheels in a forward direction;
 a body member pivotably connected to the frame; and
 an engagement rod attached to the body member, the engagement rod extending from the first rod engagement portion to the second rod engagement portion, wherein rotation of the body member causes the engagement rod to move downward and release the first and second arms to pivot downward to restrain the pair of front wheels.

* * * * *